United States Patent Office 3,086,049
Patented Apr. 16, 1963

3,086,049
MERCAPTAN AND AMIDE PRODUCTION
John J. Godfrey, Silver Spring, Md., assignor to California Research Corporation, San Francisco, Calif., a corporation of Delaware
No Drawing. Filed Mar. 16, 1960, Ser. No. 15,262
2 Claims. (Cl. 260—561)

This invention relates to the preparation of mercaptans and amides from thioesters.

The mercaptans and amides obtainable pursuant to the process of the present invention are known to have utility in various fields. For example, the mercaptans are known to have utility in the field of rubber manufacture, and certain of the amides are known to have direct utility, for example as solvents, as well as utility in organic synthesis.

The thioesters from which mercaptans are prepared pursuant to the process of the present invention may be prepared in various conventional ways, for example by the free radical addition of thioacids to olefins.

It is known that mercaptans can be prepared from thioesters both by hydrolysis and alcoholysis. However, processes involving either of these routes have serious disadvantages; for example the hydrolysis of these water-insoluble esters is extremely slow, and alcoholysis results in only fair yields.

It has now been found that thioesters can be converted to mercaptans and amides quickly and in good yields by reaction with certain nitrogen-containing compounds. Reactions are efficient and complete at low temperatures and pressures, although moderately higher temperatures and pressures also are operable. The nitrogen-containing compounds include ammonia, whereby ammonolysis is effected, and certain amines, whereby aminolysis is effected. For example:

Aminolysis—

Ammonolysis—

The thioesters suitable in the process of the present invention are aliphatic carboxylic acid thioesters having 6 to 20 carbon atoms, preferably 6 to 14 carbon atoms, and having the general form

where the R′CO, or acid, portion of the molecule is derived from an aliphatic carboxylic acid, viz., acetic, propionic or butyric acid, thus making R′ contain one, two or three carbon atoms, respectively, and where R in the RS, or mercaptan, portion of the molecule is an organic radical containing a chain of at least 2 aliphatic carbon atoms linked to the sulfur of the thioacid, and which may contain one or more substituents that are inert under the conditions of the reaction, including, for example, aryl-, alkyl-, alkoxy- and cycloalkyl-substituents.

Examples of the above suitable thioesters include:

n-Dodecylthioacetate
Undecylthioacetate
Decylthioacetate
Nonylthioacetate
Octylthioacetate
Isobutylthioacetate
β-Phenylethylthioacetate
γ-Phenylpropylthioacetate
δ-Phenylbutylthioacetate
β-Cyclohexylethylthioacetate
γ-Cyclohexylpropylthioacetate
δ-Cyclohexylbutylthioacetate
n-Dodecylthiopropionate
Undecylthiopropionate
Decylthiopropionate
Nonylthiopropionate
Octylthiopropionate
Isobutylthiopropionate
β-Phenylethylthiopropionate
γ-Phenylpropylthiopropionate
δ-Phenylbutylthiopropionate
β-Cyclohexylethylthiopropionate
γ-Cyclohexylpropylthiopropionate
δ-Cyclohexylbutylthiopropionate
n-Dodecylthiobutyrate
Undecylthiobutyrate
Decylthiobutyrate
Nonylthiobutyrate
Octylthiobutyrate
Isobutylthiobutyrate
β-Phenylethylthiobutyrate
γ-Phenylpropylthiobutyrate
δ-Phenylbutylthiopropionate
β-Cyclohexylethylthiobutyrate
γ-Cyclohexylpropylthiobutyrate
δ-Cyclohexylbutylthiobutyrate Thioesters of less than 4 carbon atoms are not comprehended by the process of the present invention; as a practical matter the advantages and utility of the process are offset by limitations as to availability of feed to the process. For example, thioacetic acid is readily obtained in a variety of ways, for example by the reaction of ketene with hydrogen sulfide or by a base catalyzed reaction of hydrogen sulfide with acetic anhydride. The thioacid in turn is readily converted to a thiol ester by a free radical addition to an olefin; however, because ethylene and thioacetic acid are the lowest molecular weight species for the respective homologous series, $C_4$ is the carbon lower limit. Thioesters having more than 20 carbon atoms are not comprehended by the process of the present invention, because as a practical matter distillation cuts made in preparing feed stocks commonly are made at a $C_{20}$ cut point, and because the reaction with higher molecular weight thioesters is impracticably slow.

The amines suitable in the process of the present invention are primary and secondary aliphatic amines having less than six carbon atoms and having the general form:

where R and R′ may be the same or different alkyl groups, or one may be hydrogen and the other an alkyl group.

Examples of the above suitable amines include:

Methyl amine
Ethyl amine
n-Propyl amine
Isopropyl amine
Butyl amine
Methyl ethyl amine
Methyl isopropyl amine
Dimethyl amine
Diethyl amine Aromatic and tertiary amines are unsatisfactory in the process of the present invention. As the molecular weight of the amine increases, the reaction slows down to the extent that amines having six or more carbon atoms are unsatisfactory.

The process of the present invention may be conducted with the thioester in liquid phase, or in vapor phase.

However, from a practical standpoint liquid phase is preferable because of the difficulties attendant upon achieving vapor phase operation and because of the increased equipment size involved in such operation.

The process generally is conducted at from about the melting point of the thioester feed to about its boiling point. The upper, or boiling point temperature limitation is meaningful for the lower thioesters, for example those having up to about 12 carbon atoms, but becomes less meaningful with higher molecular weight thioesters, the boiling points of which rise rapidly with increasing molecular weight. The reaction is exothermic, and at higher temperatures during continuous operation it may be found desirable to add the amine or ammonia more slowly. At hgiher temperatures undesirable side reactions tend to occur, including air oxidation where the reaction is not conducted in an inert atmosphere. In view of the foregoing, a practical temperature range for conducting the reaction is from about 0° C. to 200° C., and preferably from about 15° C. to 150° C.

The process may be conducted with or without a solvent. If a solvent is used, it may be an inert solvent such as pentane or hexane, with which temperature can be controlled by the attachment of a reflux condenser to the reactor; in this way heat of reaction can be removed.

The process may be conducted in either a batchwise or continuous manner, subject to the need for adequate temperature control with the various possible reactants, because of the exothermicity of the reaction.

The following examples will serve to further illustrate the process of the present invention.

*Example 1* n-Dodecyl thioacetate was placed in a bomb connected to a tank of ammonia and was allowed to react with the ammonia in liquid phase at room temperature. The reaction proceeded to completion, with controlled evolution of heat, in a few minutes. The reaction mixture was removed from the bomb and was found to separate into two layers, one layer substantially comprising n-dodecyl-mercaptan, and the other layer substantially comprising acetamide, a polar compound immiscible with the long-chain alkyl mercaptan. The two layers were separated from each other with ease by water washing, because the acetamide is water-soluble and may be readily washed from the n-dodecyl mercaptan with water.

*Example 2* n-Dodecyl thioacetate was reacted with sufficient methyl amine, added over a period of one hour, to completely react with the thioester. During the period of the addition the temperature rose from 20° C. to 60° C. Upon completion of the reaction the reaction mixture was cooled to room temperature, at which temperature it consisted of two separate organic liquid phases, one substantially comprising N-methyl acetamide and one substantially comprising n-dodecyl mercaptan. The mercaptan and amide were recovered in high yield by separation of the phases and water washing of the mercaptan phase to remove traces of the amide. Negligible side reactions occur in this low-temperature region, and yields with the various thioester starting materials are essentially quantitative without recycle or can be made so by recycle of any unconverted ester.

*Example 3*

The procedure in Example 2 was repeated, with the only changes being the use of n-butylamine instead of methyl amine, and the maintenance of the temperature at 80° C. for 30 minutes by application of heat. The products were n-dodecyl mercaptan and N-n-butyl acetamide.

*Example 4* n-Dodecyl thioacetate was reacted in a stirred 500 ml., 3-neck flask with sufficient dimethyl amine, added over a period of one hour, to completely react with the thioester. During the period of addition, the temperature rose from 20° C. to 60° C. Upon completion of the reaction the reaction mixture was cooled to room temperature, at which temperature it consisted of two separate organic liquid phases, one substantially comprising N,N-dimethyl acetamide and one substantially comprising n-dodecyl mercaptan. The mercaptan and amide were recovered in high yield by separation of the phases and water washing of the mercaptan phase to remove traces of the amide.

*Example 5*

Using the same procedure as in Examples 3 and 4, $C_{10}$–$C_{20}$ thioacetate was reacted with anhydrous methylamine. Rapid addition of the amine to the thioacetate caused an exotherm after which the temperature of the reaction flask was maintained at 80° C. for a period of two hours. Upon cooling, phase separation occurred at 60°–65° C. The separated mercaptan phase was freed from the N-methylacetamide phase by water washing, and the mercaptan and amide were recovered in high yields.

*Example 6*

Equimolar amounts of aniline and n-dodecylthioacetate were heated at 80° C. for two hours. No reaction occurred, thus indicating the inoperability of the aromatic amine in the present process.

From the foregoing it may be seen that the process of the present invention provides a highly effective route to two useful products from a thioester starting compound, and that the process is a distinct improvement over alcoholysis and hydrolysis processes for producing mercaptans from thioesters, particularly in that the reaction proceeds more quickly, yields are better, and an amide product is produced in addition to a mercaptan.

No limitations are intended in connection with the process other than those appearing in the appended claims.

I claim:

1. A process for producing a mercaptan and an amide from a water-insoluble thioester having from 6 to 20 carbon atoms and having the formula:

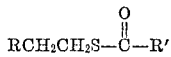

where R′ is an alkyl selected from the group consisting of methyl, ethyl and propyl and where R is a member of the group consisting of alkyl of at least 2 carbon atoms, carbocyclic aryl and cycloalkyl, which consists essentially in forming a mixture consisting of said thioester and ammonia as the sole reactants, maintaining said reaction mixture in a reaction zone at a temperature between about 0° to about 200° C., thereby forming a mercaptan phase and an amide phase, and recovering the mercaptan and the amide so obtained.

2. A process for producing a mercaptan and an amide from a water-insoluble thioester having from 6 to 20 carbon atoms and having the formula:

where R′ is an alkyl selected from the group consisting of methyl, ethyl and propyl and where R is a member of the group consisting of alkyl of at least 2 carbon atoms, phenyl and cycloalkyl, which consists essentially of forming a mixture consisting of said thioester in liquid phase and amomnia as the sole reactants, maintaining said mixture in a reaction zone at a temperature between about 15° to about 150° C., thereby forming a mercaptan phase and an amide phase, and recovering the mercaptan and the amide so obtained.

References Cited in the file of this patent

UNITED STATES PATENTS

| | | |
|---|---|---|
| 2,238,928 | Cohn et al. | Apr. 22, 1941 |
| 2,709,164 | Wieland | May 24, 1955 |
| 2,786,048 | Schwyzer | Mar. 19, 1957 |

(Other references on following page)

OTHER REFERENCES

Conant: The Chemistry of Organic Compounds, published by The Macmillan Company (New York), pages 264–265 (1939).

Hackh's Chemical Dictionary: (3rd Ed.), published by the Blakiston Company (Philadelphia), page 30 (1944).

Lowy et al.: An Introduction to Organic Chemistry, published by John Wiley and Sons, Inc. (New York), pages 213–214 (1945).

Degering: An Outline of Organic Nitrogen Compounds, published by University Lithoprinters (Ypsilanti, Mich.), pages 397–399 (1950).

Reid: Organic Chemistry of Bivalent Sulfur, Volume 1, page 29, published by Chemical Publishing Co., Inc. (New York), 1958.